Feb. 10, 1942.  C. W. DENNIS  2,272,318
REVERSING RELIEF VALVE
Filed July 25, 1941  2 Sheets-Sheet 1

Inventor
Charles W. Dennis,
By
G. C. Kennedy
Attorney

Patented Feb. 10, 1942

2,272,318

UNITED STATES PATENT OFFICE 2,272,318

REVERSING RELIEF VALVE

Charles W. Dennis, Chicago, Ill., assignor to The Viking Pump Company, Cedar Falls, Iowa, a corporation of Delaware Application July 25, 1941, Serial No. 403,958

1 Claim. (Cl. 137—53)

My invention relates to improvements in reversing relief valves, particularly such as may be employed for use with a rotary pump, and one object thereof is to combine with a valve stem a flexible reactive partition in one end part of the valve housing mounted on the valve stem yieldingly to isolate the medial chamber of its housing from resilient means adjustably mounted in a removable cap for governing the play of a valve closure in the opposite end part of the housing.

Another object of my improvement is to supply the connection between said stem and said closure with an anti-friction ball device for assuring proper contact of the valve with its seat.

Other improvements in said devices will be hereinafter alluded to and described.

It is to be understood that my invention may be employed for use with other liquids than oil, and other propelling means for the respective liquid or liquids in the operation of the device.

It is also to be understood that my said invention is operable by liquid pressure applied to either end part of the valve device as desired.

My invention is not restricted to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

Figure 1:
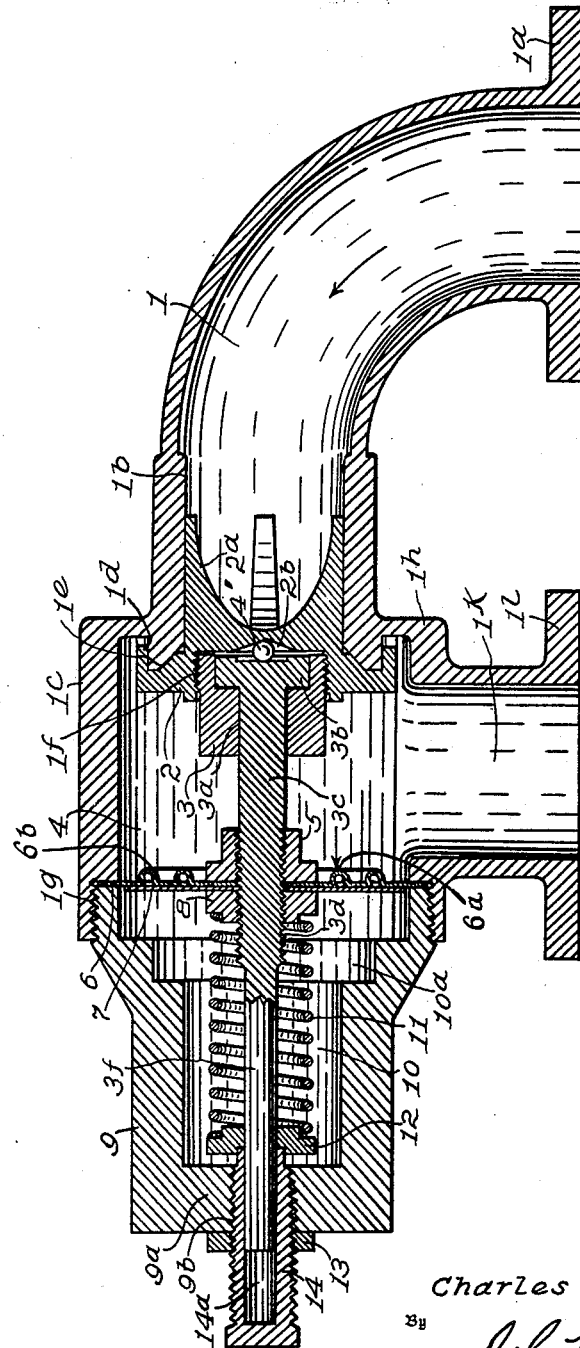
Figure 2:
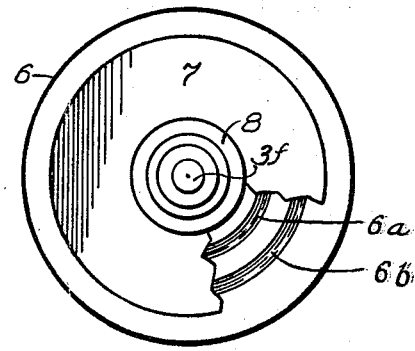
Figure 3:
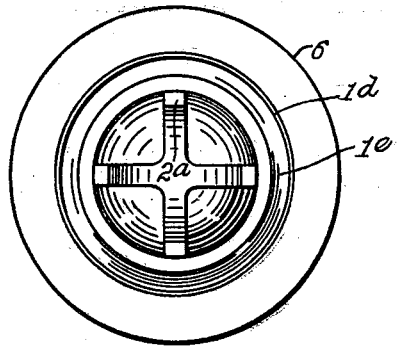
Figure 4:
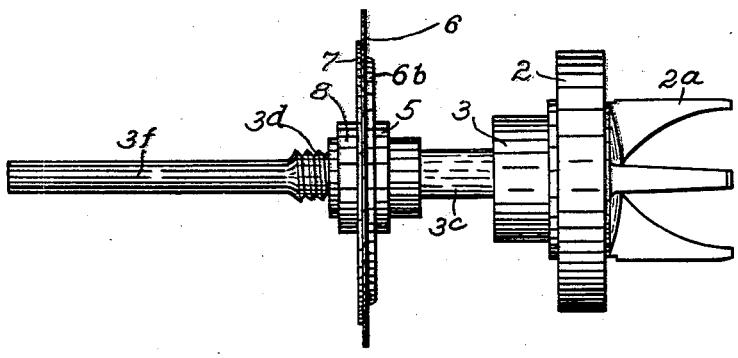

In the drawings, Fig. 1 is a longitudinal medial section of my improved reversing relief valve device with its housing. Fig. 2 shows one end face of the flexible reactive diaphragm with an opposed plate of less diameter abutting it. Fig. 3 is an elevation of the opposite end faces of said diaphragm, together with the end guides and discoidal part of the valve. Fig. 4 is an elevation laterally of the valve stem with its head, and showing the flexible reactive diaphragm mounted on the stem.

Referring to said Fig. 1, a valve housing is shown having parts 1 and 9 connected by a threaded joint at 1g. The end element 1 has an outer terminal ring 1a, and said part 1 may be of another shape and direction as desired. This element 1 has a thickened tubular part 1b which at its left-hand end terminates in an inwardly directed bevel 1e, and the numeral 1c denotes a wall part of larger diameter on a ringed part, the farther end of the part 1c having an inner thread 1g which seats therein an outwardly threaded end part of a cylindric hollow member 9 closed at its left-hand end integrally by an end wall 9a which has a central threaded aperture 9b, the latter receiving therethrough the threaded stem 14, and secured by a nut 13 on said stem. The part 9 is slopingly widened toward the part 1c. The right-hand part of the inner wall of the part 9 is stepped but may be otherwise shaped. The screw 14 has a cylindric axial hollow 14a opening to the right to receive the left-hand end of a cylindrical central shaft 3d, upon which is mounted a cap ring 12. A coiled compression spring 11 is mounted around the shaft 3d. Another ring 8 is mounted on a threaded widened part 3c of the shaft 3d to contact the right hand end of the spring 11. A rigid disk 7 is apertured and mounted movably on the threaded part 3c, and a flexible reactive disk 6 of wider diameter has its outer edge part seated between and clamped by the housing parts 1c and 9, the disk 6 having one or more concentric spaced troughs 6a and 6b. Another internally threaded flanged ring 5 is mounted on the threaded part of the stem 3d, for holding the disks 6 and 7 in contact with and between said parts 8 and 5. The threaded part 3c has a right-hand annular part 3b thereon, and a portion 3a of the part 3c is devoid of a thread, whereby a hollow member 3 may be slipped onto said threadless part adjacent its terminal 3b. A downwardly directed hollow member 1k projects from a widened part 1h of the housing 1c and is in communication with the medial chamber 4, the lower end part of the member 1k at 1—1 having an external rib 1l.

A valve-head 2 has an outer ring part provided with a socket 1f inwardly threaded to removably engage a threaded part of the member 3, and an anti-friction ball 4' is loosely engaged by the stem-head 3b and by the conical bottom 2b of the threaded socket 1f, said valve having a plurality of guides 2a. The valve 2 has its right-hand rim part inwardly hollowed to fit the coned left-hand end of the body part 1b at 1e, to form a seal.

It will be seen that a liquid such as an oil may be delivered under pressure into either of the necks 1 or 1k. If the liquid is delivered through the neck 1 its pressure will open to the left the valve head 2 to permit passage of the liquid by way of the chamber 4 and out at the neck 1k. If the liquid is delivered under pressure into the neck 1k, the flexible reactive diaphragm 6 will be shifted a short distance to the left to compress the spring 11 and to open the valve 2 through the stem 3c, permitting oil under pressure to pass the valve and through the neck 1. The device thus permits flow of oil in either of opposite directions by way of the necks as the housing is connected to a source of oil under pressure entering one or the other. The coiled spring 11, and the reactive diaphragm, when the oil is not under pressure, causes the valve to be closed upon its seat.

It is to be understood that my invention may be employed with liquids other than oil, and is particularly useful for heavy liquids that will not readily solidify around the spring, thus destroying its flexibility in use. The spring is isolated from the oil by the flexible diaphragm. Either neck 1 or 1k may be used as an inlet and pressure opens the valve for passage of the liquid through the remaining neck.

I claim:

A relief valve comprising a body formed of detachably connected portions forming a chamber, one portion having a curved conduit and a second conduit spaced from the curved conduit with both conduits communicating with the chamber, the other portion being provided with a closed end having a threaded aperture therethrough, a screw-threaded adjustment sleeve having one end closed and mounted in said threaded aperture, a cylindrical valve stem having one end slidably seated in said sleeve, the middle portion of said stem being threaded and the other end thereof having an enlarged head, an externally threaded sleeve mounted on said head, the first mentioned body portion having a seat flange projecting into the chamber and having an inner bevelled face surrounding the chamber end of the curved conduit, a valve head within the chamber and having an annularly recessed rim portion adapted to seat about the seat flange when the valve is closed, the valve head having an internally threaded recess on one side for screw-threaded engagement with the externally threaded sleeve on said stem, said valve head having a plurality of circumferentially spaced guide arms on its other side slidably guided within the seat end of the curved conduit, the opposed faces of the internally threaded recess of the valve head and the enlarged stem head being oppositely dished, a ball bearing seated loosely in and between said dished portions, an apertured ring loosely engaged by the inner end of the screw-thread adjustment sleeve, a coil spring mounted about the cylindrical stem and engaged at one end by said apertured ring, a pair of threaded clamping members mounted on the threaded portion of the valve stem, a flexible discoidal diaphragm having a central aperture to receive the said stem, and having its peripheral portion clamped being adjacent faces of the valve body portions, a rigid centrally apertured disc of smaller diameter than that of the valve chamber mounted on the stem adjacent the diaphragm for reenforcing said diaphragm, said rigid disc and diaphragm being clamped between the clamping members mounted on the threaded portion of the valve stem, the other end of said coil spring engaging one of the clamping members to urge the valve head toward its seat, said conduits being so arranged with respect to the valve head and the diaphragm that excess fluid pressure in either conduit may unseat the valve head.

CHARLES W. DENNIS.